United States Patent [19]

Nakamura et al.

[11] Patent Number: 5,942,332

[45] Date of Patent: Aug. 24, 1999

[54] COMPOSITE MOLDING COMPRISING SILICONE GEL MOLDING AND PEELABLE FILM, AND METHOD FOR MANUFACTURING SAME

[75] Inventors: Akito Nakamura; Yuichi Tsuji, both of Chiba Prefecture, Japan

[73] Assignee: Dow Corning Toray Silicone Company, Ltd., Tokyo, Japan

[21] Appl. No.: 08/878,789

[22] Filed: Jun. 19, 1997

[30] Foreign Application Priority Data

Jun. 19, 1996 [JP] Japan .................................. 8-178649

[51] Int. Cl.⁶ ...................................................... B32B 9/04
[52] U.S. Cl. ............................ 428/447; 428/217; 428/446
[58] Field of Search ...................... 428/217, 446, 428/447

[56] References Cited

U.S. PATENT DOCUMENTS

| | | | |
|---|---|---|---|
| 4,517,238 | 5/1985 | Mine et al. | 428/212 |
| 4,662,973 | 5/1987 | Gotou et al. | 156/307.4 |
| 4,780,260 | 10/1988 | Yoshida et al. | 264/255 |
| 5,279,890 | 1/1994 | Ikeno et al. | 428/217 |
| 5,424,374 | 6/1995 | Okami | 525/478 |
| 5,587,244 | 12/1996 | Flinchbaugh | 428/447 |

FOREIGN PATENT DOCUMENTS

| | | |
|---|---|---|
| 61-277414 | 12/1986 | Japan . |
| 5-69511 | 3/1993 | Japan . |
| 5-69512 | 3/1993 | Japan . |

OTHER PUBLICATIONS

Japanese Industrial Standard, Physical Testing Methods for Vulcanized Rubber, JIS K 6301 (1975).

*Primary Examiner*—Mukund J. Shah
*Assistant Examiner*—Deepak Rao
*Attorney, Agent, or Firm*—Paula J. Lagattuta; Larry A. Milco

[57] ABSTRACT

A composite molding comprising a silicone gel molding and a peelable film which does not suffer from the problems of adhesion of dirt and dust, adhesion of moldings to each other or deformation of moldings, and which has improved handling characteristics. The invention also covers a method for manufacturing such a composite molding.

9 Claims, 1 Drawing Sheet

COMPOSITE MOLDING COMPRISING SILICONE GEL MOLDING AND PEELABLE FILM, AND METHOD FOR MANUFACTURING SAME

BACKGROUND OF THE INVENTION

1. Field of the Invention

The present invention concerns a composite molding comprising a silicone gel molding and a peelable film, and a method for manufacturing the same.

2. Description of the Related Art

Silicone gel moldings are superior in terms of vibration-absorbing properties, electrical characteristics, heat resistance and water resistance, etc., and are therefore used in a broad range of applications such as shock-absorbing materials, protective materials, sealing materials and sound-proofing materials, etc.

However, since silicone gel moldings of this type have a strong surface tack, problems such as the adhesion of dirt and dust to the surfaces of such molding, the adhesion of such moldings to each other, and deformation resulting from the adhesion of such moldings to other materials, etc., have been encountered. Furthermore, since silicone gels themselves have a low mechanical strength, such gels are easily deformed and damaged.

Numerous methods have been proposed in the past as methods for solving such problems. For example, methods have been proposed in which an organohydrogenpolysiloxane containing silicon-bonded hydrogen atoms is applied directly to the surface of a heat-cured silicone gel molding and diffused into the surface of said silicone gel molding, after which this organohydrogenpolysiloxane is heat-cured, thus forming a hard coating film on the surface of the silicone gel molding (see Japanese Patent Application Kokoku No. 1-25704 and Japanese Patent Application Kokoku No. 6-45222). However, although the surface tack problems of silicone gel moldings obtained using such methods is ameliorated to some extent, these methods do not completely solve the abovementioned problems of adhesion of dirt and dust, adhesion of moldings to each other and deformation of moldings. In the case of such methods, furthermore, two heating processes are required; accordingly, such methods are inferior in terms of productivity, and are not satisfactory as methods for the mass production of silicone gel moldings.

Other methods of addressing the problems of dirt pick up, adhesion and deformation of silicone gel moldings are also known. In Japanese Patent Application Kokai No. 61-277414, a silicone molding in which the degree of cure varies in the direction of thickness is obtained by applying an organohydrogenpolysiloxane to the surface of a silicone gel composition which is capable of forming a silicone gel by being cured and then heating the resulting material before diffusion takes place. In Japanese Patent Application Kokai No. 5-69511 and Japanese Patent Application Kokai No 5-69512, a silicone gel molding which has a surface layer consisting of a silicone elastomer or silicone resin layer is obtained by causing a composition which forms a silicone elastomer or silicone resin layer after curing to contact the surface of a silicone gel composition, and then curing this assembly by heating. In Japanese Patent Application Kokai No. 6-88281, a silicone gel molding which has a high-hardness surface layer is obtained by pouring a silicone gel into a mold whose inside surface has been coated beforehand with an organohydrogenpolysiloxane, and then curing this assembly by heating. However, silicone gel moldings obtained using these methods suffer from the following problem: specifically, the components which form the surface layer are drawn into the silicone gel composition so that the curing of the surface layer becomes nonuniform. Furthermore, although the surface tack of silicone gel moldings obtained by the abovementioned methods is ameliorated to some extent, the abovementioned problems of adhesion of dirt and dust, adhesion of moldings to each other and deformation of moldings remain unsolved.

It is an object of the present invention to provide (a) a composite molding consisting of a silicone gel molding and a peelable film which does not suffer from the problems of adhesion of dirt and dust, adhesion of moldings to each other or deformation of moldings, and which is superior in terms of handling characteristics during storage, shipping or mounting on other materials, and (b) a method for manufacturing such a composite molding.

SUMMARY OF THE INVENTION

Figure 1:
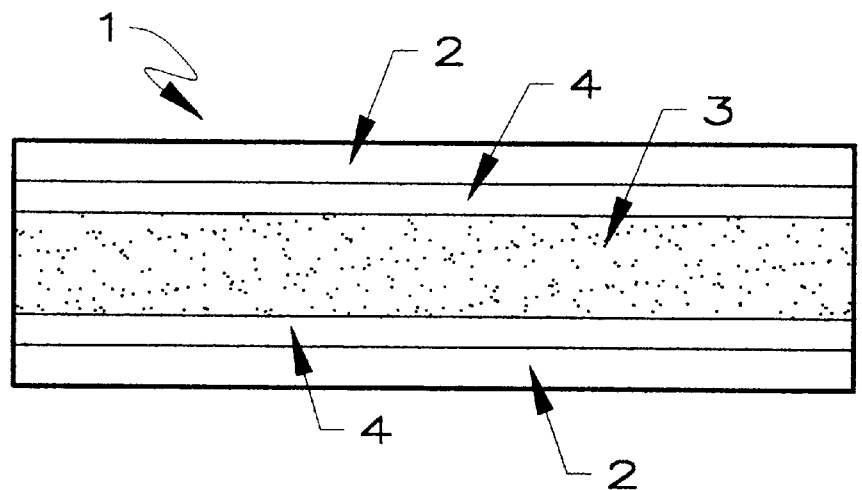
FIG. 1 is a sectional view which illustrates the composite molding consisting of a silicone gel and a peelable film that was obtained in Practical Example 1 of the present invention.
Figure 2:
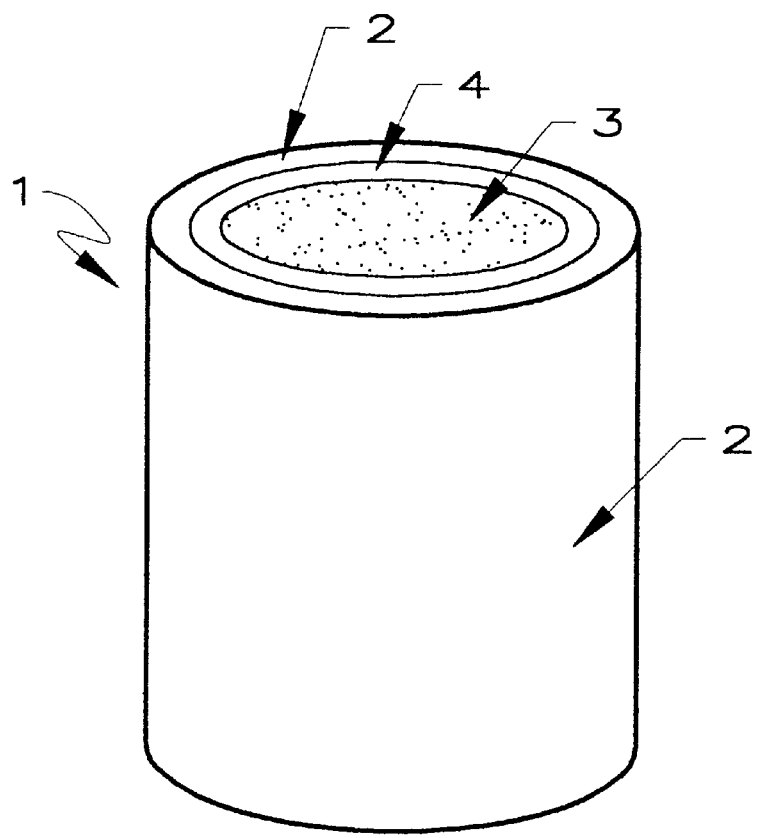
FIG. 2 is a sectional view which illustrates the composite molding consisting of a silicone gel and a peelable film that was obtained in Practical Example 2 of the present invention.

The present invention concerns a composite molding comprising a silicone gel molding and a peelable film which is characterized by the fact that said composite molding is constructed from (i) a silicone gel molding in which a cured silicone coating film which has a higher hardness than the silicone gel is formed on the surface of said silicone gel; and (ii) a peelable film which adheres to the surface of said silicone gel molding, and which can be peeled from said silicone gel molding. The invention also relates to a method for manufacturing a composite molding comprising a silicone gel molding and a peelable film; said method comprising the steps of (A) applying an organohydrogenpolysiloxane having at least three silicon-bonded hydrogen atoms per molecule to the surface of a peelable film; (B) contacting an addition reaction curable silicone gel composition to said surface of said film; and (C) curing said addition reaction curable silicone gel composition.

DETAILED DESCRIPTION OF THE INVENTION

First, the composite molding of the present invention which is constructed from a silicone gel molding and a peelable film will be described.

The term "silicone gel", as used in reference to the composite molding of the present invention, refers to a silicone comprised chiefly of an organopolysiloxane, and which is endowed with a partial three-dimensional network structure by cross-linking, so that this gel shows deformation and limited fluidity under stress. In the case of this silicone gel, the hardness measured by means of a JIS A hardness gauge as specified in JIS K6301 (i. e., the JIS A hardness) is ordinarily 0 to 10, and the hardness measured by means of an Asker C hardness gauge is ordinarily 0 to 30. Furthermore, the abovementioned Asker C hardness gauge corresponds to the spring type hardness 7 gauge specified in JIS S6050.

The silicone gel molding of the present invention comprises a silicone gel having a surface and a cured silicone coating film formed on said surface of said silicone gel. The hardness of said cured silicone coating film is higher than the hardness of said silicone gel. The hardness of this cured silicone coating film is ordinarily 0 to 10 (preferably 0 to 5) in terms of JIS A hardness, and 0 to 30 in terms of Asker C hardness. Furthermore, it is desirable that the hardness of this coating film differ from the hardness of the silicone gel by a value of 1 or greater in terms of JIS a hardness, or by a value of 5 or greater in terms of Asker C hardness. Moreover, it is not absolutely necessary that this coating film be formed over the entire surface of the silicone gel molding; it would also be possible to form said coating film only on those portions of the surface of the silicone gel molding that require protection. Furthermore, there are no particular restrictions on the shape or size, etc., of the silicone gel molding used; such specifications may be appropriately selected in accordance with the intended use of the silicone gel molding. Generally, however, a shape such as sheet-form, cylindrical, columnar, block-form or spherical is desirable.

The composite molding of the present invention comprises such a silicone gel molding and a peelable film which adheres tightly to the surface of this silicone gel molding, but which can be peeled from said silicone gel molding. Here, there are no particular restrictions on the type, etc., of the peelable film that is used; this peelable film may be any film that can be peeled from a silicone gel molding as defined in the present invention. Examples of such peelable films include thermoplastic resin films such as fluororesin films, polyethylene films, polypropylene films and polyester films, etc., as well as films formed by subjecting the surfaces of such thermoplastic resin films to a peelability treatment such as the application of a fluororesin coating, etc.

Next, the method used to manufacture the composite molding of the present invention will be described.

The composite molding of the present invention is manufactured by (i) coating all or part of the surface of a peelable film with (A) an organohydrogenpolysiloxane having at least three silicon-bonded hydrogen atoms per molecule, (ii) causing an addition reaction curable silicone gel composition to contact the organohydrogenpolysiloxane-coated surface of the aforementioned film, and then (iii) curing said composition.

The peelable film used in this method is as described above. The organohydrogenpolysiloxane of component (A) which is applied as a coating to the surface of said film is a component which forms a cured silicone coating film layer with a high hardness when said component is caused to contact the aforementioned silicone gel composition and is cured during molding. In order for this component (A) to form a high-hardness coating film with a three-dimensional network structure when said component contacts the silicone gel composition, it is necessary that said component have at least three silicon-bonded atoms per molecule. There are no particular restrictions on the molecular structure of this component; said component may have a linear structure, a linear structure with some branching, or a cyclic structure. Concrete examples of such a component include trimethylsiloxy-terminated methylhydrogenpolysiloxanes, trimethylsiloxy-terminated dimethylsiloxane-methylhydrogensiloxane copolymers; dimethylphenylsiloxy-terminated methylphenylsiloxane-methylhydrogensiloxane copolymers; cyclic methylhydrogenpolysiloxanes, and copolymers consisting of dimethylhydrogensiloxane units and $SiO_{4/2}$ units.

Furthermore, this component (A) may be mixed with other organopolysiloxanes or diluted with organic solvents in order to adjust the permeation of said component into the silicone gel composition, or in order to improve the coating characteristics of the component on the peelable film.

Methods which can be used in order to apply the abovementioned component (A) to the peelable film include brush coating methods, sponge coating methods and spray coating methods, etc. Any of these methods may be used in the present invention. Furthermore, in order to reduce the surface tack of the silicone gel molding, and in order to obtain a cured silicone coating film which has a hardness sufficient to maintain the mechanical strength, it is necessary that the hardness of the cured silicone coating film measured at the contact interface with the peelable film to which component (A) is applied be higher than the hardness of the silicone gel itself, i. e., higher than the hardness of the interior portions of the silicone gel molding (that is, the hardness of the cured product of the addition reaction curable silicone gel composition itself). It is desirable that this difference in hardness be 1 or greater in terms of JIS A hardness, or 5 or greater in terms of Asker hardness. There are no particular restrictions on the amount of the abovementioned 4t component (A) that is applied as a coating, as long as said amount is sufficient so that a coating film of said component (A) is continuously formed on the surface of the peelable film to which said component (A) is applied (at the contact interface with said peelable film).

In the method of the present invention for manufacturing a composite molding, an addition reaction curable silicone gel composition is caused to contact the surface of the peelable film which has been coated with the abovementioned organohydrogenpolysiloxane constituting component (A), and this composition is cured by heating.

In preferred embodiments, the addition reaction curable silicone gel composition used in this method is a composition comprising (B) 100 parts by weight of an organopolysiloxane having at least two silicon-bonded alkenyl groups per molecule, (C) an organohydrogenpolysiloxane having an average of at least two silicon-bonded hydrogen atoms per molecule (the amount of this component that is added to the composition being an amount which is such that the ratio of the number of moles of silicon-bonded hydrogen atoms in this component to the number of moles of silicon-bonded alkenyl groups in component (B) is from (0.1:1) to (1:1)), and (D) a catalytic amount of a platinum type catalyst.

The polyorganosiloxane of component (B) used in the present method is a component which constitutes the chief ingredient of the aforementioned addition reaction curable silicone gel composition. This component must have two or more alkenyl groups per molecule. The preferred alkenyl groups are vinyl, allyl, and propenyl. Furthermore, examples of silicon-bonded groups other than alkenyl groups which may be contained in this component include substituted or unsubstituted monovalent hydrocarbon groups, e. g., alkyl groups, such as methyl, ethyl and propyl; aryl groups such as phenyl and tolyl, and halogenated alkyl groups, such as 3,3,3-trifluoropropyl and 3-chloropropyl.

The molecular structure of this component may be a linear structure, a linear structure containing branches, a cyclic structure or a network-form structure. There are no particular restrictions on the molecular weight of this component; however, in order to insure that the cured composition will form a silicone gel, it is desirable that the viscosity of this component at 25° C. be 100 centipoise (100 mPa.s.) or greater. Examples of this component include dimethylvinylsiloxy-terminated dimethylpolysiloxanes; dimethylvinylsiloxy-terminated dimethylsiloxane-methylvinylsiloxane copolymers, trimethylsiloxy-terminated dimethylsiloxane-methylvinylsiloxane copolymers; dimethylvinylsiloxy-terminated dimethylsiloxane-methylphenylsiloxane copolymers; and organopolysiloxane resins consisting of trimethylsiloxy groups or dimethylvinylsiloxy units and $SiO_{4/2}$ units.

The organopolysiloxane of component (C), which has at least two silicon-bonded hydrogen atoms per molecule, produces a gel-form cured product by reacting with the alkenyl groups in component (B). It is necessary that this component (C) have at least two silicon-bonded hydrogen atoms per molecule. There are no particular restrictions on the molecular structure of this component; said component may have a linear structure, a linear structure containing branches, or a cyclic structure. Concrete examples of components which can be used include dimethylhydrogensiloxy-terminateddidimethylpolysiloxanes; trimethylsiloxy-terminated methylhydrogenpolysiloxanes; trimethylsiloxy-terminated dimethylsiloxane-methylhydrogensiloxane copolymers; dimethylphenylsiloxy-terminated methylphenylsiloxane-methylhydrogensiloxane copolymers; cyclic methylhydrogenpolysiloxanes, and copolymers consisting of dimethylhydrogensiloxane units and $Si_{2/4}$ units.

The amount of this component that is added to the composition is an amount which is such that ratio of the number of moles of silicon-bonded hydrogen atoms in this component to the number of moles of silicon-bonded alkenyl groups in component (B) is from (0.1:1) to (1:1). If the molar ratio is less than (0.1:1), the hardness of the silicone gel composition will be insufficient. If the molar ratio exceeds (1:1), the overall molding will become a rubber-form molding with a high hardness.

The platinum type catalyst of component (D) is a catalyst which is used in order to cure the aforementioned addition reaction curable silicone gel composition. Examples of catalysts which can be used in this case include finely powdered metallic platinum, platinum black, chloroplatinic acid, platinum tetrachloride, olefin complexes of chloroplatinic acid, alcohol solutions of chloroplatinic acid, complex compounds of chloroplatinic acid and alkenylsiloxanes, rhodium compounds and palladium compounds. The amount of this platinum type catalyst that is added is a catalytic amount, and is ordinarily in the range of 0.1 to 500 parts by weight per 1,000,000 parts by weight of component (B).

The silicone gel composition used in the present invention can easily be manufactured by uniformly mixing the abovementioned components (B) through (D). In addition to these components, various additives may be added to the composition, as long as said additives do not interfere with the object of the present invention. Examples of additives which can be used include universally known additives which have conventionally been used in silicone rubbers for purposes such as reinforcement, adjustment of viscosity, improvement of heat resistance, improvement of flame retarding properties, improvement of thermal conductivity and improvement of electrical conductivity, etc. There are no particular restrictions on types of additives which can be used. Concrete examples of such additives include reinforcing fillers such as fumed silica, precipitated silica, calcined silica, fumed titanium oxide and carbon black, etc., non-reinforcing fillers such as pulverized quartz, diatomaceous earth, asbestos, iron oxide, aluminum oxide, aluminosilicic acid and calcium carbonate, etc., and fillers which have been treated with organo-silicon compounds such as organosilanes or organopolysiloxanes. Moreover, small amounts of curing retarding agents (for example, alkyne alcohols such as 3-methyl-1-butyn-3-ol, 3,5-dimethyl-1-hexyn-3-ol or phenylbutynol, etc., "enyne" compounds such as 3-methyl-3-penten-1-yne or 3,5-dimethyl-3-hexen-1-yne, etc., and other compounds such as tetramethyltetrahexenylcyclotetrasiloxane or benzotriazole, etc.) may be added as an additive used to inhibit the curing reaction of the addition reaction curable silicone gel composition used in the present invention, as long as such addition does not interfere with the object of the present invention.

The composite molding of the present invention can easily be manufactured by (for example) (i) placing a peelable film which has been coated with the abovementioned organohydrogenpolysiloxane of component (A) in the required position(s) in a mold or on the inside walls of a vessel, (ii) introducing an addition reaction curable silicone gel composition by a method used for the molding of silicone rubbers, e. g., a method such as compression molding, transfer molding, injection molding or potting, etc., and (iii) curing said composition by heating. In this case, molding may also be accomplished by onsite molding using the member in which the silicone gel molding is to be mounted as a (molding) vessel. Furthermore, in cases where the mold has an opening (as when a potting method is used), it is also possible to paste the peelable film to the open area after the silicone gel composition has been introduced into the mold, and to cure the silicone gel composition by applying heat afterward. Furthermore, methods which can be used for the continuous molding of a sheet-form composite molding include methods such as extrusion molding or calender molding, etc., using a peelable film treated with component (A) as the base material.

The curing temperature of the addition reaction curable silicone gel composition is ordinarily in the range of 50 to 170° C. If the curing temperature is less than 50° C., the curing time required will become excessively long so that there is a drop in productivity. If the curing temperature is greater than 70° C., problems such as softening of the peelable film and foaming of the liquid-form silicone gel composition arise.

The composite molding of the present invention can be effectively used as a buffering material, a sealing material or a shock-absorbing material, etc. In particular, the composite molding of the present invention can be effectively used as a member (such as a buffering member, protective member, sealing member or soundproofing member, etc.) which is built into a device. In such cases, the composite molding of the present invention comprising the abovementioned silicone gel molding and peelable film is manufactured beforehand in the shape of the aforementioned member. Then, immediately prior to use, the peelable film can be peeled away, and the silicone gel molding itself can be extracted and mounted in various types of devices. Alternatively, it would also be possible to perform the method of the present invention for manufacturing a composite molding inside the device in which said molding is to be mounted, thus manufacturing a composite molding according to the present invention (i. e., a composite molding comprising a silicone gel molding and a peelable film), and then to peel away the peelable film, thus obtaining a member that is built into the aforementioned device.

EXAMPLES

Next, the present invention will be described in detail in terms of practical examples of application. In the practical examples, all "parts" are parts by weight, and all viscosity values are values measured at 25° C.

Practical Example 1

A a liquid-form silicone gel base was prepared by uniformly mixing 100 parts of a dimethylvinylsiloxy-terminated dimethylpolysiloxane (viscosity: 2,000 centipoise (2000 mPa.s.), vinyl group content: 0.23 wt %) and 20 parts of fumed silica with a specific surface area of 200 m$^2$/g (which had been surface-treated with dimethyldichlorosilane), and heat-treating the resulting mixture in a vacuum.

Next, 1.4 parts of a trimethylsiloxy-terminated dimethylsiloxane-methylhydrodienesiloxane copolymer having a silicon-bonded hydrogen atom content of 0.3 wt %, 0.2 parts of a platinum complex of chloroplatinic acid and divinyltetramethyldisiloxane (platinum concentration: 0.5 wt %) and 0.05 parts of 3,5-dimethyl-l-hexyn-3-ol (used as a curing retarding agent) were added to 100 parts of the abovementioned liquid-form silicone gel base, and this mixture was uniformly mixed, thus producing a liquid-form addition reaction curable silicone gel composition. The viscosity of this liquid-form silicone gel composition was 1,600 centipoise (1600 mPa.s.).

Meanwhile, a press-molding mold consisting of an upper plate, a center mold and a lower plate (sheet type mold with cavity dimensions of 200×200×10 mm), and two sheets of a peelable film obtained by coating the surface of a peelable film (thickness: 0.2 mm) consisting of a tetrafluoroethylene-hexafluoropropylene dimethyler with a trimethylsiloxy-terminated dimethylsiloxane-methylhydrogensiloxane copolymer (viscosity: 10 centistokes (10 mPa.s.), content of silicon-bonded hydrogen atoms 0.7 wt %; hereafter referred to as "organohydrogenpolysiloxane") at a coating rate of 20 g/m$^2$, were prepared. One sheet of the abovementioned peelable film was placed on the lower plate of the mold. Here, this sheet of the peelable film was arranged so that the organohydrogenpolysiloxane-coated surface of said film was on the side of the film that faced the interior of the mold cavity. The center mold was then set on top of this film, thus forming a cavity whose bottom surface was covered by the aforementioned peelable film. Next, the abovementioned liquid-from silicone gel composition was poured into this cavity. Afterward, the other sheet of the peelable film was applied so that the organohydrogenpolysiloxane-coated surface of said sheet contacted the liquid-form silicone gel composition, and this assembly was immediately subjected to heating for 5 minutes at 150° C. so that the liquid-form silicone gel composition was cured. The cured sheet thus obtained had rubber-form elastic coating films possessing elasticity at the contact interfaces with the peelable film, and the interior portions of this cured sheet consisted of a gel-form cured product. Specifically, after the peelable film was removed, a sheet-form molding which had a high-hardness cured silicone coating film on both sides, and whose interior portions consisted of a gel-form silicone gel, was obtained. In regard to the hardness of this molding, the surface coating film portions showed a JIS A hardness of 4 and an Asker C hardness of 20, while the internal silicone gel exposed by removing the surface coating film with a cutter showed a JIS a hardness of 0 and an Asker hardness of 7.

Practical Example 2

A silicone gel molding was prepared in the same manner as in Practical Example 1, except that one of the two sheets of the aforementioned peelable film was not coated with an organohydrogenpolysiloxane. When the peelable film was removed following molding and the hardness of the silicone gel molding was measured, the surface on the side coated with an organohydrogenpolysiloxane showed a JIS A hardness of 4 and an Asker C hardness of 20, while the interior portions of the sheet and the surface on the uncoated side showed a JIS A hardness of 0 and an C hardness of 7.

Practical Example 3

15 parts of fumed silica with a specific surface area of 200 m$^2$/g, 5 parts of hexamethyldisilazane (used as a surface treatment agent for the silica) and 2 parts of water were added to 100 parts of a dimethylvinylsiloxy-terminated dimethylpolysiloxane (viscosity: 2,000 centipoise (2000 mPa.s.), vinyl group content: 0.23 wt %), and this mixture was uniformly mixed. The mixture was then heat-treated in a vacuum, thus producing a liquid-form silicone gel base which possessed fluidity.

Next, 0.6 parts of a trimethylsiloxy-terminated dimethylsiloxane-methylhydrogensiloxane copolymer (content of silicon-bonded hydrogen atoms: 0.7 wt %) and 2 parts of a dimethylhydrogensiloxy-terminated dimethylpolysiloxane (content of silicon-bonded hydrogen atoms: 0.17 wt %; hereafter referred to as an "organohydrogenpolysiloxane) were mixed with 100 parts of the abovementioned liquid-form silicone gel base. Afterward, 0.1 parts of a platinum complex of chloroplatinic acid and divinyltetramethyldisiloxane (platinum concentration: 0.5 wt %) and 0.03 parts of 3,5-dimethyl-1-hexyn-2-ol (used as a curing retarding agent) were added and uniformly mixed, thus producing a liquid-form addition reaction curable silicone gel composition. The viscosity of this liquid-form silicone gel composition was 1,200 centipoise (1200 mPa.s.).

Meanwhile, a coated peelable film was prepared in which the surface of a peelable film (thickness: 0.2 mm) consisting of a polytetrafluoroethylene was coated at the rate of 30 g/m$^2$ with a mixture (weight ratio 20:1) consisting of a trimethylsiloxy-terminated dimethylsiloxane-methyhydrogensiloxane copolymer (content of silicon-bonded hydrogen atoms: 0.7 wt %) and a vinyl-group-containing methylpolysiloxane resin consisting of Vi(Me)$_2$SiO$_{1/2}$ units and SiO$_{4/2}$ units (Vi group content: 5.6%). Next, the abovementioned liquid-form silicone gel composition was poured into a polyethylene cup which had a bottom-surface diameter of 7 cm and a height of 8 cm. Next, the abovementioned coated peelable film was applied so that the coated surface of said peelable film contacted the liquid-form silicone gel composition, and this assembly was immediately subjected to heating for 30 minutes at 60° C. so that the liquid-form silicone gel composition was cured. The cylindrical cured product thus obtained had a rubber-form elastic coating film possessing elasticity at the contact interface with the peelable film; the interior portions of this cured product consisted of a gel-form cured product. Specifically, after the peelable film was removed, a molding which had a high-hardness cured silicone coating film on the upper surface, and whose interior portions and other surfaces consisted of a gel-form silicone gel, was obtained. In regard to the hardness of this molding, the surface coating film portions showed an Asker hardness of 33, while the uncoated bottom surface of the molding and the internal portions exposed by removing the surface coating film with a cutter showed an Asker C hardness of 20.

Practical Example 4

100 parts of a dimethylvinylsiloxy-terminated dimethylpolysiloxane (viscosity: 40,000 centipoise (40,000 mPa.s.), vinyl group content: 0.09 wt %) and 40 parts of fumed silica with a specific surface area of 200 m²/g which had been surface-treated with dimethyldichlorosilane were uniformly mixed, and this mixture was heat-treated in a vacuum. Next, 2 parts of a hydroxy-terminated dimethylpolysiloxane (hydroxy group content: 4 wt %) was mixed with the abovementioned mixture as a plasticizer, thus producing a nonfluid silicone gel base.

Meanwhile, two sheets of a coated peelable film in which the surface of a peelable film (thickness: 0.2 mm) made of a tetrafluoroethylene-hexafluoropropylene copolymer was coated at the rate of 20 g/m² with a trimethylsiloxy-terminated dimethylsiloxane-methyhydrogensiloxane copolymer (content of silicon-bonded hydrogen atoms: 0.7 wt %) were prepared. A sheet form composition (thickness: 3 mm) formed by means of an extruder was placed on the curing-agent-coated surface of one sheet of the abovementioned film. Next, the other sheet of said film was applied so that the coated side of said sheet contacted the surface of the aforementioned silicone gel composition, and the thickness of this assembly was made uniform by passing the assembly between rolls with a fixed gap of 3 mm. Afterward, the silicone gel composition was immediately cured by being heated for 5 minutes at 150° C. The cured sheet thus obtained had rubber-form elastic coating films possessing elasticity at the contact interfaces with the peelable film, and the interior portions of this cured sheet consisted of a gel-form cured product. Specifically, after the peelable film was removed, a sheet-form molding which had a high-hardness cured silicone coating film on both sides, and whose interior portions consisted of a gel-form silicone gel, was obtained. In regard to the hardness of this molded sheet, measurement of the hardness "as is" produced a JIS A hardness value of 0 and Asker C hardness value of 4; meanwhile, the interior portions from which the surface coating film was removed showed a JIS A hardness of 0 and an Asker C hardness of 2.

The composite molding consisting of a silicone gel and a peelable film provided by the present invention is constructed from a silicone gel molding in which a cured silicone coating film which has a higher hardness than the silicone gel is formed on the surface of said silicone gel, and a peelable film which adheres tightly to the surface of said silicone gel molding, and which can be peeled from said silicone gel molding. Accordingly, this composite molding is characterized by the fact that [i] said molding does not suffer from the problems of adhesion of dirt and dust, adhesion of moldings to each other or deformation of moldings, and [ii] said molding is superior in terms of handling characteristics during storage, shipping or mounting on other materials. Furthermore, the manufacturing method of the present invention is characterized by the fact that said method allows the efficient manufacture of composite moldings which have the abovementioned special features.

We claim:

1. A composite molding comprising:
   (i) a silicone gel molding comprising
       (a) a silicone gel having a surface, and
       (b) a cured silicone coating film formed on at least a part of said surface, said cured silicone coating film having a hardness which is greater than the hardness of said silicone gel; and
   (ii) a peelable film adhered to said silicone gel molding, said peelable film being peelable from said silicone gel molding.

2. The composite molding claimed in claim 1, wherein the silicone gel molding is a sheet-form molding.

3. The composite molding claimed in claim 1, wherein the silicone gel molding is a cylindrical molding.

4. The composite molding claimed in claim 1, wherein the silicone gel molding is a columnar molding.

5. The composite molding claimed in claim 1, wherein the hardness of the silicone gel is 0 to 10 as measured according to JIS A, and 0 to 30 as measured according to Asker C hardness.

6. The composite molding claimed in claim 1, wherein the difference between the hardness of the silicone gel and the hardness of the cured silicone coating film formed on the surface of said silicone gel is 1 or greater, as measured according to JIS A, and 5 or greater, as measured according to Asker C hardness.

7. The composite molding claimed in claim 1, wherein the peelable film is a thermoplastic resin film.

8. A method for manufacturing a composite molding comprising
   (i) a silicone gel molding comprising
       (a) a silicone gel having a surface, and
       (b) a cured silicone coating film formed on at least a part of said surface, said cured silicone coating film having a hardness which is greater than the harness of said silicone gel; and
   (ii) a peelable film adhered to said silicone gel molding, said peelable film being peelable from said silicone gel molding,
said method comprising the steps of:
   (1) applying (A) an organohydrogenpolysiloxane having three silicon-bonded hydrogen atoms per molecule as a coating to a surface of peelable film;
   (2) contacting the organohydrogenpolysiloxane-coated surface of said film, with an addition reaction curable silicone gel composition; and
   (3) allowing said addition reaction curable silicone gel composition to cure.

9. The manufacturing method claimed in claim 8, wherein the addition reaction curable silicone gel composition comprises (B) 100 parts by weight of an organopolysiloxane having an average of at least two silicon-bonded alkenyl per molecule; (C) an organopolysiloxane having an average of at least two silicon-bonded hydrogen atoms per molecule; wherein the ratio of the number of moles of silicon-bonded hydrogen atoms in component (C) to the number of moles of silicon-bonded alkenyl groups in component (B) is from (0.1:1) to (1:1)); and (D) a catalytic amount of a platinum type catalyst.

* * * * *